United States Patent [19]

Schwark

[11] Patent Number: 4,929,704
[45] Date of Patent: May 29, 1990

[54] ISOCYANATE- AND ISOTHIOCYANATE-MODIFIED POLYSILAZANE CERAMIC PRECURSORS

[75] Inventor: Joanne M. Schwark, Wilmington, Del.

[73] Assignee: Hercules Incorporated, Wilmington, Del.

[21] Appl. No.: 286,839

[22] Filed: Dec. 20, 1988

[51] Int. Cl.$^5$ .............................................. C08G 77/04
[52] U.S. Cl. ......................................... 528/28; 528/25; 556/412; 525/474
[58] Field of Search .................... 528/28, 25; 556/412; 525/474

[56] References Cited

U.S. PATENT DOCUMENTS

| | | | |
|---|---|---|---|
| 3,239,489 | 3/1966 | Fink | 260/77.5 |
| 3,320,184 | 5/1967 | Fink | 260/2 |
| 3,853,567 | 12/1974 | Verbeek | 106/44 |
| 4,397,828 | 8/1983 | Seyferth et al. | 423/344 |
| 4,482,669 | 11/1984 | Seyforth et al. | 524/442 |
| 4,612,383 | 9/1986 | Laine et al. | 556/412 |
| 4,675,424 | 6/1987 | King et al. | 556/412 |
| 4,689,252 | 8/1987 | Lebrun et al. | 427/228 |
| 4,722,988 | 2/1988 | Porte et al. | 528/28 |
| 4,761,389 | 8/1988 | Rabe et al. | 501/95 |

OTHER PUBLICATIONS

Fink, W. Reaction of Isocyanates with Si–N Bonds, *Chem. Ber.*, 97 (5), 1433 (1964).
Klebe et al., J. Am. Chem. Soc. 86 (20), 4400 (1964).

*Primary Examiner*—Melvyn I. Marquis
*Attorney, Agent, or Firm*—Joanne W. Patterson

[57] ABSTRACT

Polysilazane addition polymers are prepared by (1) reacting ammonia with one or more halogenated organic silicon compounds to produce a cyclic silazane ammonolysis product and (2) reacting the ammonolysis product with from 0.1% to 30% by weight of an isocyanate, isothiocyanate, ketene, thioketene, carbodiimide, or carbon disulfide. Polysilazane addition polymers containing alkenyl or alkynyl groups can be cured by supplying energy to generate free radicals. The cured or uncured polymers can be pyrolyzed to produce silicon nitride-containing ceramic materials.

8 Claims, No Drawings

4,929,704

ISOCYANATE- AND ISOTHIOCYANATE-MODIFIED POLYSILAZANE CERAMIC PRECURSORS

FIELD OF THE INVENTION

This invention relates to polysilazane addition polymers, a method for preparing such polymers, and silicon nitride-containing ceramic materials produced by pyrolysis of the cured or uncured polymers.

BACKGROUND OF THE INVENTION

Silicon nitride has generated considerable interest as a ceramic material because of its high thermal and oxidative stability and extreme hardness. Other advantageous properties include low electrical conductivity, low coefficient of thermal expansion, excellent thermal shock and creep resistance, high strength at elevated temperatures and excellent corrosion resistance.

One recently developed method for obtaining silicon nitride-containing ceramic materials is the pyrolysis of polyorganosilazanes. Seyferth et al. (U.S. Pat. No. 4,482,669) describe the base-catalyzed cross-linking of the ammonolysis product of an organodihalosilane to form a polysilazane ceramic precursor. This material is especially useful as a binder for ceramic powders. Verbeek (U.S. Pat. No. 3,853,567) produced shaped forms such as fibers comprising a homogeneous mixture of silicon carbide and silicon nitride by pyrolyzing a shaped form of a fusible carbosilazane resin in an inert atmosphere. Lebrun and Porte (U.S. Pat. No. 4,689,252) describe the preparation of polysilazanes by the platinum-catalyzed hydrosilation reaction of a silazane or a mixture of silazanes that contain both Si-H and unsaturated hydrocarbon groups. These polymers can be cross-linked by heating and can be used for coating or impregnating substrates with ceramic material after pyrolysis. Laine and Blum (U.S. Pat. No. 4,612,383) describe the catalytic activation of Si-H, Si-Si or Si-N bonds in silanes or silazanes by metal complexes to give oligomers and polymers. The products can be pyrolyzed to silicon nitride. King et al. (U.S. Pat. No. 4,675,424) describe the preparation of polysilazanes by the reaction of an aminosilane with a low molecular weight amine in the presence of an acid catalyst. Such polymers can be pyrolyzed under nitrogen to give silicon nitride-containing ceramics. Porte and Lebrun (U.S. Pat. No. 4,722,988) disclose the preparation of polysilazane precursors for ceramics by cross-linking silazanes containing alkenyl or alkynyl substituents in the presence of a free radical generator such as a peroxide. Fink (U.S. Pat. No. 3,239,489 describes the preparation of polyureasilazanes having no mobile hydrogen atoms by the reaction of di- or polyfunctional isocyanates with silazanes. Pyrolysis of these polymers to ceramic materials is not disclosed.

In general, the above methods are deficient in that it is difficult or impossible to control the viscosities of the polysilazanes so that they are suitable for the intended end use of the polymer. For example, low viscosities are desirable for polymers used to produce thin films or to infiltrate porous ceramic bodies, and high viscosities are desirable for making fibers.

SUMMARY OF THE INVENTION

A method has now been found for preparing polysilazane addition polymers in which the viscosity of the polymer can be easily controlled. These polymers are liquid, are soluble in common organic solvents and are stable in the absence of moisture. The polymers are prepared by a method comprising (1) preparing a silazane ammonolysis product by reacting ammonia with a halogenated silicon compound selected from the group consisting of $RSiX_3$, $RR'SiX_2$ and mixtures thereof, wherein X is selected from the group consisting of Cl, Br and I; and R and R' are the same or different and are selected from the group consisting of H, substituted or unsubstituted 1-6 carbon alkyl, aryl, 1-6 carbon alkenyl and 1-6 carbon alkynyl groups, at least one of the halogenated silicon compounds containing a Si-H bond, and (2) reacting the silazane ammonolysis product with from about 0.1% to about 30% by weight, based on the weight of the ammonolysis product, of a compound selected from the group consisting of isocyanates, isothiocyanates, ketenes, thioketenes, carbodiimides and carbon disulfide. Polymers where at least one of R and R' is an alkenyl or alkynyl group can be cured by supplying energy to generate free radicals. The cured or uncured polysilazane polymers can be used to prepare silicon nitride-containing ceramic materials by heating to a temperature of at least 800° C. in an inert or ammonia-containing atmosphere.

DETAILED DESCRIPTION OF THE INVENTION

The first step of the process for preparing the polysilazane addition polymers of this invention comprises reacting ammonia, or a mixture of ammonia and a substituted or unsubstituted 1-4 carbon alkyl or aryl amine, with a halogenated silicon compound selected from the group consisting of $RSiX_3$, $RR'SiX_2$ and mixtures thereof, including mixtures where more than one compound having the formula $RSiX_3$ or $RR'SiX_2$ is used. Optionally, $RR'R''SiX$, $SiX_4$ or mixtures thereof can also be present in the reaction mixture. X can be Cl, Br, or I. Cl is preferred. R, R' and R'' can be the same or different and are selected from the group consisting of H, substituted or unsubstituted 1-6 carbon alkyl, aryl, 1-6 carbon alkenyl and 1-6 carbon alkynyl groups. At least one of the halogenated silicon compounds must have a Si-H bond. Examples of halogenated silicon compounds suitable for use in the process of this invention include, but are not limited to, methyldichlorosilane, vinylmethyldichlorosilane, tetrachlorosilane, tetrabromosilane, trichlorosilane, vinyltrichlorosilane, methyltrichlorosilane, phenyltrichlorosilane, ethyltrichlorosilane, propyltrichlorosilane, butyltrichlorosilane, methyltribromosilane, dimethyldichlorosilane, phenylmethyldichlorosilane, dimethyldibromosilane, trimethylchlorosilane, dimethylchlorosilane, dimethylvinylchlorosilane, and trimethylbromosilane.

When ammonia alone is reacted with the halogenated silicon compound, the ammonolysis product formed is predominantly cyclic, but can possibly contain small amounts (usually less than 1%) of linear species. When a mixture of ammonia and an alkyl or aryl amine is used, the ammonolysis product contains more linear than cyclic species.

The ammonolysis product is then reacted with from about 0.1% to about 30%, based on the weight of the ammonolysis product, of an isocyanate, isothiocyanate, ketene, thioketene, carbodiimide or carbon disulfide, at a temperature of less than 200° C. From about 1% to about 10% by weight of an isocyanate or isothiocyanate is preferred. The reaction can be carried out with or without a solvent, although it is preferably carried out without a solvent. Although the exact reaction mechanism is not known, it is believed that the reactant is inserted into the Si—N bond of the silazane ammonolysis product.

The isocyanates and isothiocyanates used in the process of this invention can be monofunctional or polyfunctional, substituted or unsubstituted 1–6 carbon alkyl, aryl, 1–6 carbon alkenyl or 1–6 carbon alkynyl compounds. Aryl is preferred. Suitable compounds include, but are not limited to, 2,6-tolylene diisocyanate, phenyl isocyanate, phenyl isothiocyanate, phenylmethyl isocyanate, 2,4-tolylene diisocyanate, 5-bromotolylene-2,4-diisocyanate, 3-chlorotolylene-2,6-diisocyanate, diphenylmethane-4,4′-diisocyanate, diphenylethane-2,2′-diisocyanate, napthalene diisocyanate, 2,5-dimethoxybenzene-1,4-diisocyanate, and m-tetramethylxylylene diisocyanate.

The polysilazane addition polymer that is produced by the reaction of the ammonolysis product with an isocyanate or isothiocyanate contains the following units:

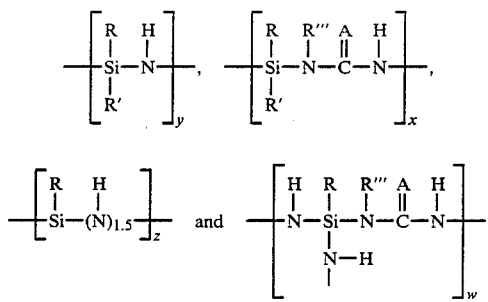

where A is O or S, R and R′ have the same meaning as described above, and at least one of R and R′ is hydrogen. R‴ has the same meaning as R and R′. Except for the case where R‴ is H, R‴ is the organic group derived from the isocyanate or isothiocyanate. If a polyfunctional isocyanate or isothiocyanate is used in the preparation of the polymer, R‴ can be substituted by one or more isocyanate or isothiocyanate groups, which also react during the formation of the polysilazane addition polymer. The values of x and y depend upon the amount of isocyanate used in the reaction, i.e., x+w=0.1% to 30% and y+z=99.9% to 70% of the polymer units. In the formula, w and z can be 0 or x and y can be 0.

The units

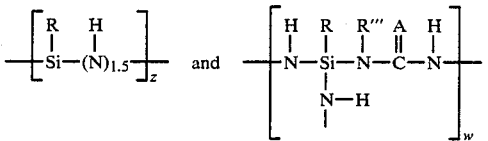

are present only if RSiX₃ is present in the reaction mixture.

After formation of the polysilazane addition polymer, heat can be supplied to raise the temperature to not greater than 300° C., preferably from 110° to 180° C., to initiate partial cross-linking as indicated by a substantial increase in molecular weight and viscosity, e.g., an increase in viscosity from 15 to 20,000 cps at 25° C., and evolution of hydrogen gas. There is no evolution of gas if the polysilazane addition polymer does not contain Si—H groups. The viscosity of the final product can be controlled by varying the amount of the compound that is reacted with the silazane ammonolysis product, e.g., by varying the amount of isocyanate or isothiocyanate that is added. Low levels of reactant produce low viscosity polymers, while higher levels produce extremely viscous polymers. The viscosity is also affected by the heating temperature, i.e., higher temperatures yield higher viscosities. The viscosity can therefore be tailored to the end use of the polymer. For most applications a material that is soluble or fusible is preferred.

The polysilazane addition polymers of this invention that contain at least one alkenyl or alkynyl group can be further cross-linked, i.e., cured, by supplying energy to generate free radicals. For example, the polymer can be heated in the presence of a radical source such as a peroxide. The polymers can also be cured by exposing the polymer to UV light or electron beam radiation.

The cured or uncured polysilazane polymers of this invention can be pyrolyzed at a temperature of at least 800° C. under an inert or ammonia-containing atmosphere to yield a silicon nitride-containing ceramic material.

The polysilazane addition polymers can be used in the preparation of ceramic fibers and foams, in the infiltration of a preform structure and subsequent pyrolysis to produce a composite silicon nitride-containing structure, in the production of oxidation resistant coatings, as a thin film for electronic applications, as an adhesive or sealant and as a binder for ceramic or metal powders.

EXAMPLE 1

Coammonolysis of Methyldichlorosilane and Vinylmethyl-dichlorosilane

A 5 liter, three-necked flask is equipped with an overhead mechanical stirrer, a dry ice/acetone condenser, (−78° C.), an ammonia/nitrogen inlet tube and a thermometer. The apparatus is sparged with nitrogen and then charged with hexane (1760 ml, dried over 4 A molecular sieves), methyldichlorosilane (209 ml, 230.9 g, 2.0, mol) and vinylmethyldichlorosilane (64 ml, 69.6 g, 0.5 mol). The ammonia is added at a rate of 3.5 l/min (9.37 mol) for one hour. During the addition, the temperature of the reaction rises from 25° C. to 69° C. After one hour, the ammonia flow is stopped and the reaction mixture cooled to room temperature. The reaction mixture is filtered on a glass-fritted funnel to remove the precipitated ammonium chloride. The hexane is removed from the filtrate under reduced pressure 28 mm Hg, 60° C.) to give (CH₃SiHNH)₀.₈(CH₃SiCH=CH₂NH)₀.₂ as a clear oil (150.76 g, 2.34 mol, 94% yield). The oil has a viscosity of 43 cps at 25° C. and a molecular weight of 560 g/mol.

EXAMPLE 2

Reaction of (CH₃SiHNH)₀.₈(CH₃SiCH=CH₂NH₀.₂ with 2,6-Tolylene Diisocyanate: 17 Hour Heating Period A 100 ml one-necked flask equipped with a stir bar and a septum is sparged with nitrogen and charged with 10.0 g of the silazane prepared as described in Example 1 and the weight percent of 2,6-tolylene diisocyanate,(TDI) indicated in the tables below. The flask is placed in an oil bath on a stirrer/hot plate and the septum is replaced with a water condenser that is capped with a septum. A nitrogen inlet needle and oil bubbler outlet are placed in the septum. The reaction mixture is then heated to the specified temperature under a nitrogen atmosphere for 17 hours. Evolution of hydrogen gas is observed. After cooling to room temperature, the viscosity of the liquid polymer is measured at 25° C. using a Brookfield cone and plate viscometer. In several reactions an insoluble, rubbery product forms. This product is designated as "gel" in the following tables.

| Temp (°C.) | Viscosity (cps) |
|---|---|
| 3 wt % TDI: | |
| 60 | 200 |
| 110 | 430 |
| 120 | 943 |
| 130 | 1600 |
| 160 | 1770 |
| 4 wt % TDI: | |
| 60 | 425 |
| 110 | 1077 |
| 120 | gel |
| 130 | gel |
| 160 | gel |
| 5 wt % TDI: | |
| 60 | 750 |
| 110 | 10,000 |
| 120 | gel |
| 130 | gel |
| 160 | gel |

The viscosity of the liquids remains constant over a one month period as determined by subsequent measurements.

EXAMPLE 3

Reaction of $(CH_3SiHNH)_{0.8}(CH_3SiCH=CH_2NH)_{0.2}$ with 2,6-Tolylene Diisocyanate: 4 Hour Heating Period The reaction apparatus described in Example 2 is charged with 10.0 g of the silazane prepared as described in Example 1 and the weight percent of 2,6-tolylene diisocyanate indicated in the tables below. The reaction mixture is then heated to the specified temperature under a nitrogen atmosphere for 4 hours. Evolution of hydrogen gas is observed. After cooling to room temperature, the viscosity of the liquid polymers is measured at 25° C. using a Brookfield cone and plate viscometer. In several reactions an insoluble, rubbery product forms. This product is designated as "gel" in the following tables.

| Temp (°C.) | Viscosity (cps) |
|---|---|
| 4 wt % TDI: | |
| 120 | 708 |
| 130 | gel |
| 5 wt % TDI: | |
| 110 | 511 |
| 120 | 1250 |
| 130 | gel |
| 160 | gel |

EXAMPLE 4

Reaction of $(CH_3SiHNH)_{0.8}(CH_3SiCH=CH_2NH)_{0.2}$ with Phenyl Isocyanate

The reaction apparatus described in Example 2 is charged with 10.0 g of the silazane prepared as described in Example 1 and the weight percent of phenyl isocyanate (PI) indicated in the tables below. The reaction mixture is then heated to the specified temperature under a nitrogen atmosphere for 17 hours. Evolution of hydrogen gas is observed. After cooling to room temperature, the viscosity of the liquid polymer is measured at 25° C. using a Brookfield cone and plate viscometer. In several reactioos an insoluble, rubbery product forms. This product is designated as "gel" in the following tables.

| Temp (°C.) | Viscosity (cps) |
|---|---|
| 4 wt % PI: | |
| 60 | 619 |
| 110 | 1530 |
| 130 | 2000 |
| 5.5 wt % PI: | |
| 60 | 1075 |
| 110 | 2800 |
| 120 | 9000 |
| 130 | gel |
| 6.9 wt % PI: | |
| 110 | 13,000 |
| 120 | gel |
| 130 | gel |
| 10 wt % PI: | |
| 110° C. | gel |
| 20 wt % PI: | |
| 110° C. | gel |
| 30 wt % PI: | |
| 110° C. | gel |

EXAMPLE 5

Reaction of $(CH_3SiHNH)_{0.8}(CH_3SiCH=CH_2NH)_{0.2}$ with Phenyl Isothiocyanate The reaction apparatus described in Example 2 is charged with 20.0 g of the silazane prepared as described in Example 1 and the weight percent of phenyl isothiocyanate (PIT) indicated in the table below. The reaction mixture is then heated to the specified temperature under a nitrogen atmosphere for 17 hours. Evolution of hydrogen gas is observed. After cooling to room temperature, the viscosity of the liquid polymer is measured at 25° C. using a Brookfield cone and plate viscometer.

| Wt. % PIT | Temp (°C.) | Viscosity (cps) |
|---|---|---|
| 3 | 110 | 3400 |
| 5.5 | 110 | 300,000 |

EXAMPLE 6

Reaction of $(CH_3SiHNH)_{0.8}(CH_3SiCH=CH_2NH)_{0.2}$ with a Diketene

A 100 ml, one-necked flask is equipped with a septum and sparged with nitrogen. The apparatus is then charged with 10.0 g of the silazane prepared as described in Example 1, 30 ml of hexane and 1.68 ml (1.21 g, 0.0120 mol) of dry triethylamine. Adipoyl chloride 8 ml, 1.0 g, 5.5 mmol) is added dropwise by syringe to generate the diketene. A white precipitate forms immediately. After 10 minutes at room temperature, the reaction mixture is filtered to remove the triethylammonium hydrochloride salt. The hexane is removed in vacuo and the reaction mixture is then heated as described in Example 2 at 130° C. for 20 hours. Evolution of hydrogen gas is observed. A clear, viscous oil is produced with a viscosity of 23,000 cps.

EXAMPLE 7

Curing of a Polysilazane with Dicumyl Peroxide

The polysilazane addition polymer prepared by the reaction of $(CH_3SiHNH)_{0.8}$ $(CH_3SiCH=CH_2NH)_{0.2}$ with 3 wt. % TDI is charged to the reaction apparatus described in Example 2. The polysilazane is heated for 17 hours at 130° C. and evolution of hydrogen gas is observed. After heating, the polysilazane has a viscosity of 1600 cps at 25° C. Dicumyl peroxide (0.5 wt. % based on the weight of the polysilazane used) is added and the reaction mixture is heated in an oil bath. At a temperature of 140° C., the liquid Polymer becomes a brittle, glassy solid. The char yield for the uncured and cured polymer is determined by thermogravimetric analysis (TGA) under a flow of nitrogen after heating the sample at 10° C./min from room temperature to 950° C.

|  | TGA Yield (%) |
|---|---|
| Uncured polysilazane | 53.6 |
| Cured polysilazane | 83.6 |

What I claim and desire to protect by Letters Patent is:

1. A process for preparing a partially cross-linked polysilazane addition polymer comprising
   (1) preparing a silazane ammonolysis product by reacting ammonia with a halogenated silicon compound selected from the group consisting of $RSiX_3$, $RR'SiX_2$ and mixtures thereof, wherein X is selected from the group consisting of Cl, Br and I; and R and R' are the same or different and are selected from the group consisting of H, substituted or unsubstituted 1-6 carbon alkyl, aryl, 1-6 carbon alkenyl and 1-6 carbon alkynyl groups, at least one of the halogenated silicon compounds containing a Si-H bond,
   (2) reacting the silazane ammonolysis product with from about 0.1% to about 30% by weight, based on the weight of the ammonolysis product, of a compound selected from the group consisting of isocyanates, isothiocyanates, ketenes, thioketenes, carbodiimides and carbon disulfide to form a polysilazane addition polymer, and
   (3) heating to a temperature not exceeding 300° C. for a time sufficient to partially cross-link the addition polymer and increase the viscosity to a value suitable for the desired end use of the polymer.

2. The process of claim 1, wherein the halogenated silicon compound additionally comprises $RR'R''SiX$, $SiX_4$ or mixtures thereof, wherein R'' has the same meaning as R and R'.

3. The polymer prepared by the process of claim 1.

4. The polymer prepared by the process of claim 1.

5. The product prepared by cross-linking the polymer prepared by the process of claim 1 by supplying energy to generate free radicals, wherein at least one of the groups R and R' is a 1-6 carbon alkenyl or alkynyl group.

6. The product prepared by cross-linking the polymer prepared by the process of claim 2 by supplying energy to generate free radicals, wherein at least one of the groups R and R' is a 1-6 carbon alkenyl or alkynyl group.

7. A polysilazane addition polymer comprising the units:

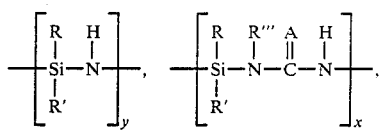

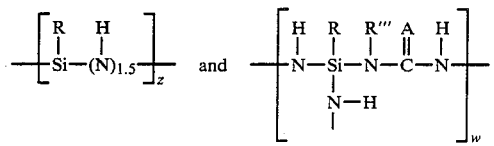

where A is 0 or S; R, R' and R''' are the same or different and are selected from the group consisting of H, substituted or unsubstituted 1-6 carbon alkyl, aryl, 1-6 carbon alkenyl and 1-6 carbon alkynyl groups, wherein at least one of R and R' is hydrogen; x+w=0.1% to 30%, y+z=99.9% to 70% of the polymer units; x and y can be 0 or w and z can be 0.

8. The product prepared by cross-linking the polymer of claim 7 by supplying energy to generate free radicals, wherein at least one of the groups R and R' is a 1-6 carbon alkenyl or alkynyl group.

* * * * *

UNITED STATES PATENT AND TRADEMARK OFFICE
CERTIFICATE OF CORRECTION

PATENT NO. : 4,929,704
DATED : May 29, 1990
INVENTOR(S) : SCHWARK

It is certified that error appears in the above-identified patent and that said Letters Patent is hereby corrected as shown below:

Column 4, line 58 " $(CH_3SiCH=CH_2NH_{0.2}$ "

should read -- $(CH_3SiCH=CH_2NH)_{0.2}$ --

Column 6, line 4  " reactioos "

should read -- reactions --

Column 6, line 59 " 8 ml "

should read -- (0.8 ml --

Column 8, claim 4 " claim 1 "

should read -- claim 2 --

Signed and Sealed this

Thirtieth Day of July, 1991

*Attest:*

HARRY F. MANBECK, JR.

*Attesting Officer*  Commissioner of Patents and Trademarks